United States Patent
Peiser

(10) Patent No.: US 7,883,402 B2
(45) Date of Patent: Feb. 8, 2011

(54) GOLF GAME HAVING COLLATERAL MILITARY RANKING SYSTEM

(76) Inventor: William E. Peiser, 85-58 263rd St., Floral Park, NY (US) 11001

(*) Notice: Subject to any disclaimer, the term of this patent is extended or adjusted under 35 U.S.C. 154(b) by 871 days.

(21) Appl. No.: 11/810,449

(22) Filed: Jun. 7, 2007

(65) Prior Publication Data

US 2008/0305845 A1 Dec. 11, 2008

(51) Int. Cl.
*A63F 13/00* (2006.01)
*A63B 67/02* (2006.01)

(52) U.S. Cl. .................... 463/3; 463/23; 273/108.1; 273/245; 273/317.1; 273/317.2; 473/131; 473/156; 434/252; 702/182

(58) Field of Classification Search .............. 463/2–3, 463/5, 7, 23, 30–32, 36–37, 42–43, 46–47, 463/50, 53, 56; 273/108.2, 108.21, 150, 273/245, 317.1, 317.2, 329–331, 359, 366–368, 273/406–408, 441, 444–446, 453, 460–461; 473/131, 136, 140–141, 143, 145–146, 150–153, 473/156, 158, 160, 202, 204–217, 219–226, 473/231, 234, 257, 266, 280, 353, 405; 434/252; 702/141, 142, 160, 182
See application file for complete search history.

(56) References Cited

U.S. PATENT DOCUMENTS

| | | | |
|---|---|---|---|
| 4,150,825 A | 4/1979 | Wilson | |
| 4,192,510 A | 3/1980 | Miller | |
| 4,504,055 A | 3/1985 | Wells | |
| 5,558,333 A * | 9/1996 | Kelson et al. | 473/131 |
| 5,890,906 A * | 4/1999 | Macri et al. | 434/247 |
| RE36,346 E * | 10/1999 | Germain | 700/92 |
| 6,217,444 B1 | 4/2001 | Kataoka et al. | |
| 6,227,973 B1 * | 5/2001 | Kikuchi | 463/31 |
| 6,321,128 B1 | 11/2001 | Costin, IV et al. | |
| 6,457,713 B1 | 10/2002 | Oppenheimer et al. | |
| 7,118,498 B2 * | 10/2006 | Meadows et al. | 473/407 |
| 7,549,918 B2 * | 6/2009 | Kang et al. | 463/3 |
| 7,806,777 B2 * | 10/2010 | Cheng | 473/131 |
| 2002/0049508 A1 * | 4/2002 | Williams | 700/92 |

(Continued)

OTHER PUBLICATIONS

*ArmyGolf*, Peiser, William E., 1st Books (2000).

(Continued)

*Primary Examiner*—David L Lewis
*Assistant Examiner*—Arthur O. Hall
(74) *Attorney, Agent, or Firm*—Donald R. Schoonover

(57) ABSTRACT

A golf game operable by data processing apparatus by one or more players comprising a video golf game having various scoring features emulating a corresponding feature of a golf game played on an actual golf course; a rank-assigning element for responsively assigning a virtual military ranking for each of the one or more players for each scoring feature of the video golf game as playing of the video golf game progresses; and an interface element interconnecting the rank-assigning element in communication with the video golf game. The virtual military ranking of each of the one or more players playing the video golf game is promoted or demoted based on his golfing scores as playing of the video golf game progresses.

1 Claim, 2 Drawing Sheets

U.S. PATENT DOCUMENTS

| | | | |
|---|---|---|---|
| 2002/0115488 A1* | 8/2002 | Berry et al. | 463/42 |
| 2003/0160387 A1* | 8/2003 | Drury | 273/245 |
| 2004/0023734 A1* | 2/2004 | McClain | 473/409 |
| 2005/0272496 A1* | 12/2005 | Reinish et al. | 463/2 |
| 2006/0003825 A1* | 1/2006 | Iwasaki et al. | 463/2 |
| 2006/0128468 A1* | 6/2006 | Yoshikawa et al. | 463/36 |
| 2007/0087804 A1* | 4/2007 | Knowles et al. | 463/16 |
| 2008/0005775 A1* | 1/2008 | Belton et al. | 725/139 |

OTHER PUBLICATIONS

*ArmyGolf: Return to Pinehurst* No. 2, 2005, Peiser, William E. (date unknown).

* cited by examiner

GOLF GAME HAVING COLLATERAL MILITARY RANKING SYSTEM

BACKGROUND OF THE INVENTION

1. Field of the Invention

The present invention relates to recreation and entertainment and, more specifically without limitation, to competitive games.

2. Description of the Related Art

Golfing is a sport enjoyed world wide. The equipment required to participate in the sport basically comprises a set of golf clubs preferably including several woods, several irons and a putter; various accessories such as extra tees, extra golf balls, etc.; and access to a golf course.

Typically, a golf course includes eighteen holes, each hole being assigned a certain "par" value wherein each "par" value in the number of strokes which an experienced golfer would need to drive his golf ball from the tee to and into the cup in the putting green of that hole. Normally, the number of strokes for shooting "par" ranges between three and five, depending on the difficulty of the hole.

If a golfer shoots "par" for a hole, then the number of strokes he needed to complete that hole is equal to the number of strokes assigned to that hole. If the number of strokes he needs for a hole is one less than "par" for that hole, then he has made a "birdie". If the number of strokes he needs for a hole is two less than "par" for that hole, then he has made an "eagle". If the number of strokes he needs for a hole is three less than "par" for that hole, then he has made a "double eagle". If he only needs a single stroke to drive his golf ball from the tee to and in the cup of that hole, then he has made an "hole-in-one".

On the other hand, if the number of strokes he needs for a hole is one more than "par" for that hole, then he has made a "bogie". Similarly, if he needs two strokes over "par", he has made a "double bogie"; if he needs three strokes over "par", he has made a "triple bogie". If his performance is consistently worse than that, he may need to find different partners for his next golf game.

Generally, golfers are divided into groups of four, with each golfer competing with the other three golfers. The winner of the game is the golfer who has the fewest total number of strokes after completion of the eighteen holes. The group may consist of fewer than four golfers if desired or necessary.

Video golf games which are operable on data processing apparatus have been developed, such as software for a computer, cartridges for a video game console connected to a television, or hard-wired hand-held devices, for example. Such video golf games include various scoring features wherein each scoring feature emulates a corresponding feature of a golf game played on an actual golf course. Such video games enable individuals who are handicapped, or others who do not have access to an actual golf course, to play simulated golf even on rainy days.

Unfortunately, playing simulated golf on data processing apparatus loses some of the competitive spirit and ego-feeding excitement which might otherwise be enjoyed by the players if the interaction were occurring on an actual golf course with real golf clubs and real golf balls.

What is needed is a golf game for one or more players that is compatible with data processing apparatus wherein the golf game rewards the players in a manner which enhances the competitive spirit and ego-feeding excitement that may otherwise be lost with prior art video golf games.

SUMMARY OF THE INVENTION

The improvements of the present invention for a golf game for use by one or more players includes a video golf game operable by a data processing apparatus wherein the video golf game includes various scoring features, each scoring feature emulating a corresponding feature of a golf game played on an actual golf course; a rank-assigning element operable by the data processing apparatus wherein the rank-assigning element is structured to responsively calculate and assign a virtual military ranking for each of the one or more players for each scoring feature of the video golf game as playing of the video golf game progresses; and an interface element structured to interconnect the rank-assigning element in communication with the video golf game.

The virtual military ranking of each of the one or more players playing the video golf game is promoted or demoted based on his golfing scores as playing of the video golf game progresses.

The rank-assigning element of the rank-assigning element may include a monitor wherein the rank-assigning element is structured to responsively cause the current rankings of the one or more players to be displayed on the monitor.

PRINCIPAL OBJECTS AND ADVANTAGES OF THE INVENTION

The principal objects and advantages of the present invention include: providing a golf game for one or more players which is usable on data processing apparatus; providing such a golf game which rewards the one or more players in a manner which enhances the competitive spirit and ego-feeding excitement that may otherwise be lost with prior art video golf games; providing such a golf game wherein a rank-assigning element promotes or demotes a virtual military ranking of each player based on his scoring performance as playing of the game progresses; and generally providing such a golf game that is easy to use, reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
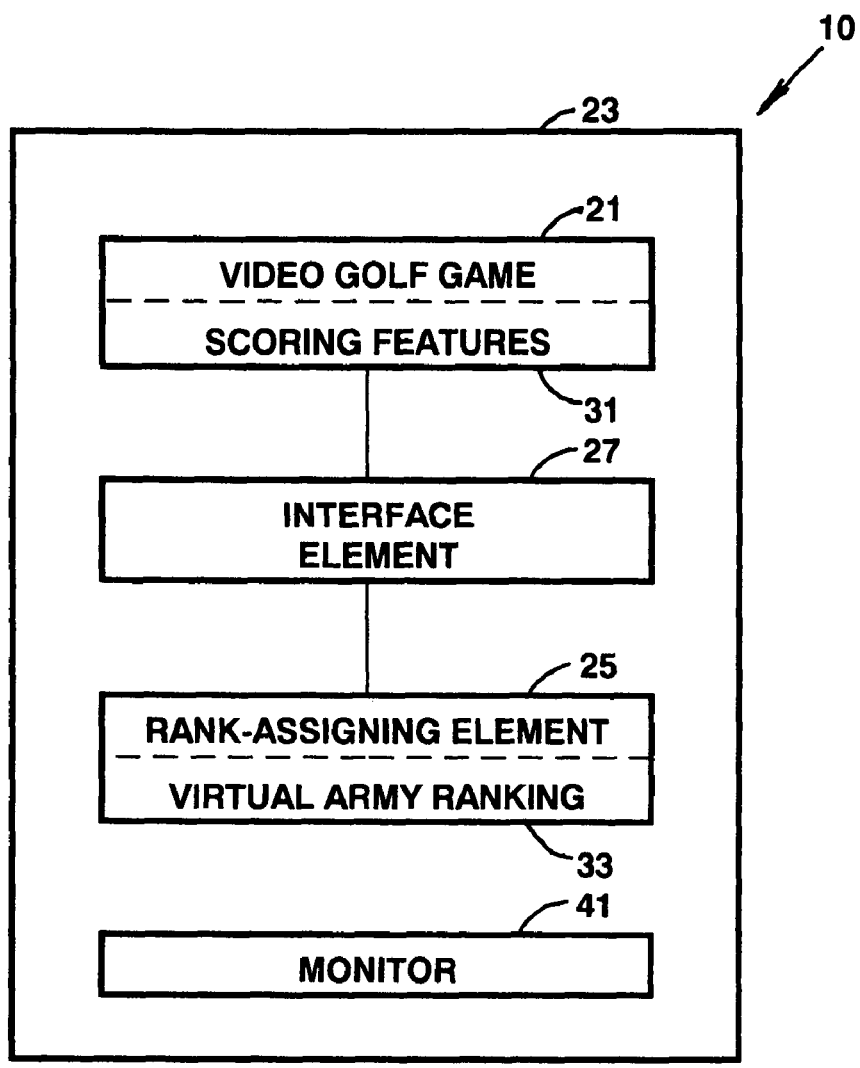
FIG. 1 is a schematic representation of a golf game having a collateral military ranking system, in accordance with the present invention.
Figure 2:
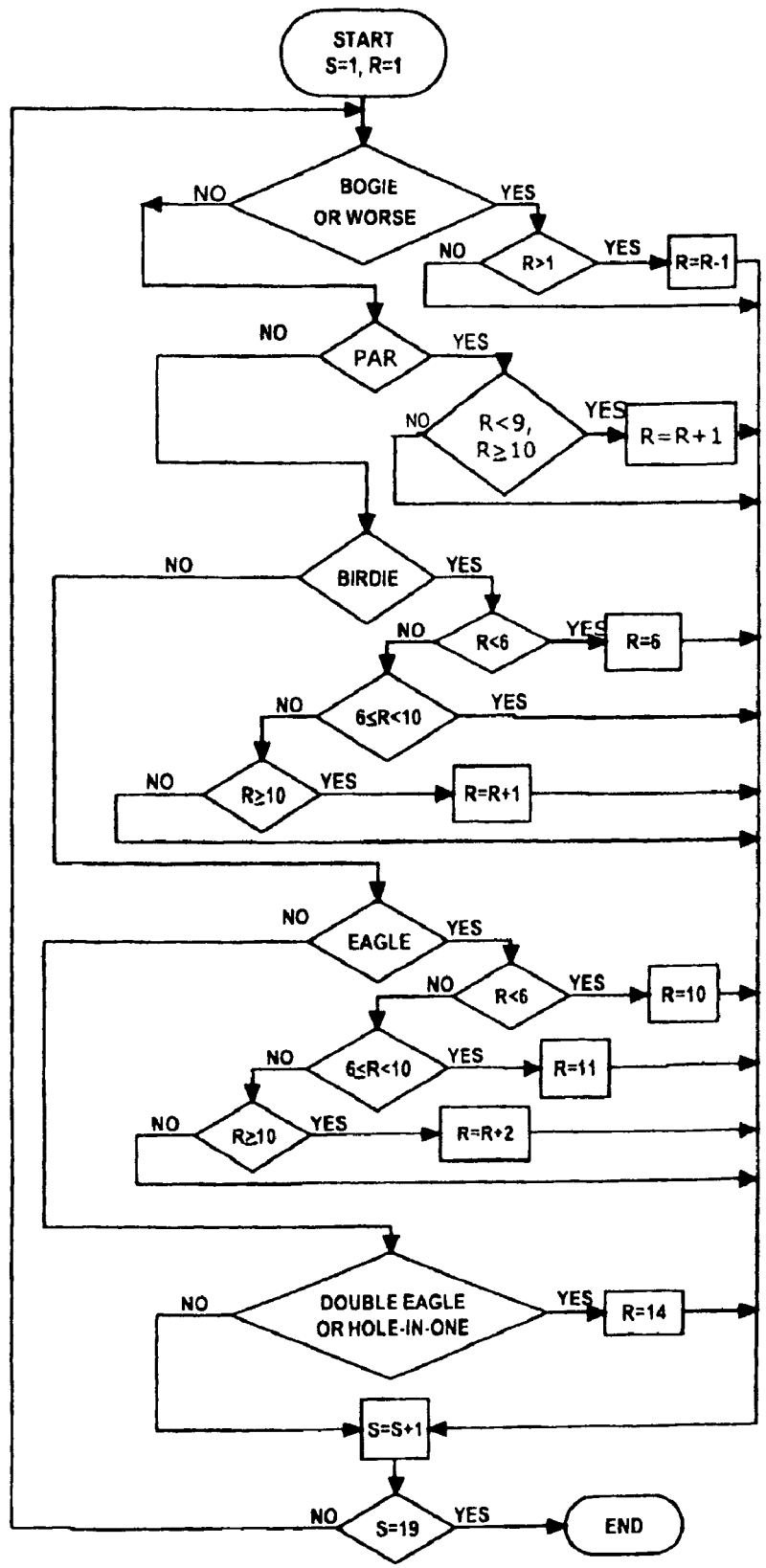
FIG. 2 is a logic diagram of a rank-assigning element of the golf game having a collateral military ranking system, in accordance with the present invention.

The reference numeral 10 generally refers to a golf game having a collateral military ranking system for use by one or more players in accordance with the present invention, as shown in FIGS. 1 and 2. The golf game 10 includes a video golf game 21 operable by a data processing apparatus 23, a rank-assigning element 25 operable by the data processing apparatus 23, and an interface element 27, as shown in FIG. 1.

The video golf game 21 is programmed and structured to emulate the various features of a golf game played on an actual golf course and may comprise one of the many currently existing video golf games which emulate a golf game played on an actual golf course. In particular, the video golf game 21 includes scoring features 31, such as "par", "birdie", "eagle", "double eagle", "hole-in-one", "bogie", "double bogie", etc., which are characteristic of actual golf games. The video golf game 21 may include software programmed and structured to be installable on a computer, or the video golf game 21 may be embedded in a microchip installed and interconnected with other circuitry in an electronic hand-held device, or other suitable arrangement. The rank-assigning element 25 is programmed or structured to responsively calculate and assign a virtual military ranking 33 for each of the one or more players for each scoring feature 31 of the video golf game 21 as playing of the video golf game 21 progresses. The rank-assigning element 25 may include software programmed and structured to be installable on a computer, or the rank-assigning element 25 may be embedded in a microchip installed and interconnected with other circuitry in an electronic hand-held device, or other suitable arrangement.

The interface element 27 is programmed and structured to interconnect the rank-assigning element 25 in communication with the video golf game 21 wherein the virtual military ranking 33 of each of the one or more players playing the video golf game 21 is promoted or demoted based on the his golfing scores as playing of the video golf game 21 progresses as disclosed herein. The interface element 27, which may include software or a portion of a microchip or other suitable arrangement, is programmed and structured to provide compatibility between the video golf game 21 and the rank-assigning element 25.

Preferably, the rank-assigning element 25 is programmed and structured to cause the rankings of the players to be displayed and updated on a monitor 41 as the golf game 10 progresses.

Alternatively, the golf game 10 of the present invention may comprise software integrally comprising a video golf game having a rank-assigning capability as disclosed herein wherein the software is installable on a data processing apparatus, or the golf game 10 of the present invention may comprise software embedded in a microchip mounted in an electronic hand-held device wherein the software integrally comprises a video golf game having a rank-assigning capability as disclosed herein.

Virtual military ranks, R, assignable by the golf game 10 as described herein are patterned after army rankings. It is to be understood, however, that the virtual military rankings may be patterned after the rankings of the navy, air force, marines, etc. The exemplary rankings discussed hereinbelow are as follows:

Private (R=1);
Corporal (R=2);
Sergeant (R=3);
$2^{nd}$ Lieutenant (R=4);
$1^{st}$ Lieutenant (R=5);
Captain (R=6);
Major (R=7);
Lieutenant Colonel (R=8);
Colonel (R=9);
XGeneral (R=10);
XXGeneral (R=11);
XXXGeneral (R=12);
XXXXGeneral (R=13); and
XXXXXGeneral (R=14).

It is to be understood that for some applications, the golf game 10 of the present invention may comprise more or fewer than fourteen virtual military rankings as discussed herein.

It is also to be understood that for some applications, the golf game 10 of the present invention may comprise more or fewer than eighteen skirmishes, such as nine skirmishes for a shorter game or thirty-six skirmishes for a longer game, for example.

It is further to be understood that for some applications of the golf game 10 of the present invention, the titles assigned to the different virtual military rankings may vary from those discussed herein, such as Brigadier General, Major General, Lieutenant General, General, and General of the Army in lieu of XGeneral, XXGeneral, XXXGeneral, XXXXGeneral, and XXXXXGeneral, respectively.

The playing of each hole of the golf game 10 is characterized as a skirmish, S. In other words, S=1 for the first hole or first skirmish, with the value of S progressing incrementally to S=18 for the eighteenth and last hole of the golf game 10.

At the "START" of the game, S=1, the number of competing players is entered into the game, with each player starting with the rank of Private, R=1. As in a golf game played on an actual golf course, the primary object of each player is to complete the eighteen holes with a fewer number of total strokes than any other player in his group. Thus, as each player takes his turn during each skirmish, he tries to complete the skirmish with the least number of strokes.

In addition to minimizing his stroke count during each skirmish, each player attempts to at least shoot "par" for each hole. If a player is successful in shooting "par", the virtual military ranking that he has at the beginning of that skirmish is promoted by one rank, R=R+1. In other words, if during a particular skirmish, a player has a virtual military ranking of Private, R=1, and he shoots "par" during that skirmish, then his virtual military ranking is promoted to Corporal, R=R+1=2. The virtual military ranking of each player continues to be promoted by one rank for each successive "par" that he shoots up to and including promotion to the virtual military ranking of Colonel, R=9. However, in order for the virtual military ranking of a player to be promoted to XGeneral, R=10, that player must shoot a "birdie", i.e., one stroke less than "par" for that skirmish. An exemplary logic diagram of the promotions and demotions of the virtual military rankings of the present invention for each player is shown in FIG. 2.

Similarly, if at the beginning of a skirmish, a player has a virtual military ranking lower than Captain, R<6, and shoots a "birdie", then his virtual military ranking is promoted to Captain, R=6. If at the beginning of a skirmish, a player has a virtual military ranking equal to or greater than Captain, R≧6, but less than XGeneral, R<10, and shoots a "birdie", then his virtual military ranking is promoted to XGeneral, R=10. If at the beginning of a skirmish, a player has a virtual military ranking equal to or greater than XGeneral, R≧10, but less than XXXXXGeneral, R<14, and shoots a "birdie", then his virtual military ranking is promoted one rank, R=R+1.

Similarly, if at the beginning of a skirmish, a player has a virtual military ranking less than Captain, R<6, and shoots an "eagle", then his virtual military ranking is promoted to XGeneral, R=10. If at the beginning of a skirmish, a player has a virtual military ranking equal to or greater than Captain, R≧6, but less than XXXXGeneral, R<13, and shoots an "eagle", then his virtual military ranking is promoted to XXGeneral, R=11. If at the beginning of a skirmish, a player has a virtual military ranking equal to or greater than XGeneral, R≧10, but less than XGeneral, R<10, and shoots an "eagle", then his virtual military ranking is promoted two ranks, R=R+2.

If during any skirmish, a player shoots a "double eagle" or a "hole-in-one", then his virtual military ranking is promoted to XXXXXGeneral, R=14. No player can receive a virtual military ranking greater than R=14.

A "neutral" occurs when a player shoots a "bogie" or a "double bogie". In that event, the virtual military ranking of that player remains unchanged for that skirmish. However, a "triple bogie" or worse is not a "neutral" and that player's virtual military ranking is demoted one rank, R=R−1. No player can have a virtual military ranking less than R=1.

If desired, the golf game 10 may accommodate players having different skill levels somewhat like handicapping in golfing on actual golf courses. For example, each player may select one of three modes of play: (1) basic golf mode, (2) advanced golf mode, or (3) pro golf mode. The demotions applied to players selecting the basic golf mode are those hereinbefore described. For players selecting the advanced golf mode, "neutral" applies only to a "bogie" but does not apply to a "double bogie". In other words, if a player playing in advanced golf mode shoots a "double bogie", the virtual military ranking of that player is demoted one rank, R=R−1. There is no "neutral" in the pro golf mode.

Based on the disclosures and teachings herein, a person skilled in the software art should be able to provide the necessary programming and communication interconnections needed to adapt the rank-assigning element and interface element to the video golf game.

After completion of the eighteen skirmishes, the player with the highest virtual military ranking wins the game regardless of which player has the lowest total score. If, at the end of the game, the highest virtual military ranking attained during the eighteen skirmishes is attained by more than one player, the player having both (i) the highest virtual military ranking, and (2) the lowest total number of strokes wins the game.

To further enhance competitiveness and ego-building attributes of the present invention, the players may observe various formalities, such as players honoring one of the other players by saluting when the other player receives a promotion in his virtual military ranking, address each other by their current virtual military ranking followed by a short salute, etc.

In an application of the golf game present invention, whether that use be with software installed on a computer or in a hand-held device or other suitable arrangement, the number of players and a skill level for each player are entered. The play then proceeds as it would have proceeded without the rank-assigning element. The rank-assigning element then operates in the background making the desired ranking promotions and demotions as described herein.

It is to be understood that while certain forms of the present invention have been illustrated and described herein, it is not to be limited to the specific forms or arrangement of parts as described and shown.

What is claimed and desired to be covered by Letters Patent is as follows:

1. A golf game apparatus for use by one or more players, the golf game apparatus comprising:
   (a) a video golf game operable by a data processing apparatus, the video golf game including various scoring features wherein each scoring feature emulates a corresponding feature of a golf game played on an actual golf course;
   (b) a rank-assigning element operable by the data processing apparatus, the rank-assigning element being structured to responsively calculate and assign a virtual military ranking for each of one or more players at each hole of the video golf game, the virtual military ranking of each respective player being based on scoring features attained by the respective players at each hole of the video golf game, wherein the scoring feature has a greater value for a promotion of the respective virtual military ranking or a lesser value for a demotion of the respective virtual military ranking than the value of a number of strokes otherwise attained at each hole of the video golf game; and
   (c) an interface element structured to interconnect the rank-assigning element in communication with the video golf game;
   (d) wherein the virtual military ranking of each respective player of the one or more players playing the video golf game is promoted or demoted at each hole of the video golf game as follows:
   (1) a promotion of the virtual military ranking of a respective player of the one or more players occurs at each hole of the video golf game when the respective player attains a scoring feature selected from the group consisting of a par, birdie, eagle, double eagle or hole-in-one,
   (2) a demotion of the virtual military ranking of a respective player of the one or more players occurs at each hole of the video golf game when the respective player attains a scoring feature selected from the group consisting of a bogie, double bogie or triple bogie, and
   (3) at the end of the video golf game, if only one respective player holds a highest virtual military ranking, the one respective player is declared to be the winner; but if two or more of the respective players hold the highest virtual military ranking at the end of the video golf game, then the respective player of the two or more respective players who has a lowest total number of strokes for the entire game is declared to be the winner.

* * * * *